US012208646B2

United States Patent
Kaneko

(10) Patent No.: US 12,208,646 B2
(45) Date of Patent: Jan. 28, 2025

(54) TIRE

(71) Applicant: The Yokohama Rubber Co., LTD., Tokyo (JP)

(72) Inventor: Takeshi Kaneko, Kanagawa (JP)

(73) Assignee: The Yokohama Rubber Co., LTD., Tokyo (JP)

(*) Notice: Subject to any disclaimer, the term of this patent is extended or adjusted under 35 U.S.C. 154(b) by 0 days.

(21) Appl. No.: 17/456,844

(22) Filed: Nov. 29, 2021

(65) Prior Publication Data

US 2022/0185022 A1 Jun. 16, 2022

(30) Foreign Application Priority Data

Dec. 15, 2020 (JP) ................. 2020-207621

(51) Int. Cl.
*B60C 11/03* (2006.01)
*B60C 9/18* (2006.01)
*B60C 15/00* (2006.01)
*B60C 15/04* (2006.01)

(52) U.S. Cl.
CPC ...... *B60C 11/0304* (2013.01); *B60C 15/0081* (2013.01); *B60C 15/04* (2013.01); *B60C 2011/0353* (2013.01); *B60C 2011/0355* (2013.01)

(58) Field of Classification Search
CPC . B60C 9/18; B60C 2011/0033; B60C 11/033; B60C 11/0332; B60C 11/0327; B60C 2011/0341; B60C 11/042; B60C 11/04; B60C 2011/0386; B60C 11/0304; B60C 11/03

See application file for complete search history.

(56) References Cited

U.S. PATENT DOCUMENTS

| | | | | |
|---|---|---|---|---|
| 5,016,695 A | * | 5/1991 | Kuze | B60C 11/0304 |
| | | | | 152/209.8 |
| 7,140,410 B2 | | 11/2006 | Helt et al. | |
| 2011/0232816 A1 | * | 9/2011 | Sheehan | B60C 11/1323 |
| | | | | 152/209.24 |
| 2017/0036487 A1 | | 2/2017 | Kodaka et al. | |
| 2019/0329596 A1 | * | 10/2019 | Hiraishi | B60C 11/03 |
| 2019/0337339 A1 | * | 11/2019 | Osawa | B60C 11/0302 |

(Continued)

FOREIGN PATENT DOCUMENTS

| | | | | |
|---|---|---|---|---|
| EP | 867311 A2 | * | 9/1998 | ......... B60C 11/0306 |
| FR | 2866829 A1 | * | 9/2005 | ......... B60C 11/0083 |

(Continued)

*Primary Examiner* — Cedrick S Williams
(74) *Attorney, Agent, or Firm* — Thorpe North & Western

(57) ABSTRACT

A tire includes a mounting direction indicator indicating a tire mounting direction with respect to a vehicle. Additionally, the tire includes a first circumferential groove and a second circumferential groove extending intermittently or continuously in a tire circumferential direction. Additionally, the second circumferential groove is located further on an inner side than the first circumferential groove in a vehicle width direction in a state in which the tire is mounted on a vehicle. In addition, a distance D1 from the tire equatorial plane to the groove center line of the first circumferential groove and a distance D2 from the second circumferential groove to the groove center line have the relationship D1<D.

10 Claims, 9 Drawing Sheets

(56) References Cited

U.S. PATENT DOCUMENTS

2019/0381835 A1\* 12/2019 Grandemange ..... B60C 11/0304
2022/0235209 A1\* 7/2022 Washizu ............... B60C 1/0016

FOREIGN PATENT DOCUMENTS

| | | | | | |
|---|---|---|---|---|---|
| GB | 747693 | A | \* | 4/1956 | ........... B60C 11/032 |
| JP | 3139402 | | \* | 6/1991 | |
| JP | 04146804 | A | \* | 5/1992 | ........... B60C 11/032 |
| JP | 2015058912 | A | \* | 3/2015 | |
| JP | 2016159797 | A | \* | 9/2016 | |
| JP | 2017-030604 | A | | 2/2017 | |
| JP | 2017-222243 | A | | 12/2017 | |
| JP | 2018-062227 | A | | 4/2018 | |
| JP | 2019018830 | A | \* | 2/2019 | |
| JP | 2020-006923 | A | | 1/2020 | |

\* cited by examiner

| | CONVENTIONAL EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 | EXAMPLE 12 | EXAMPLE 13 |
|---|---|---|---|---|---|---|---|---|---|---|---|---|---|---|
| CONFIGURATION OF CIRCUMFERENTIAL GROOVE | FIG. 8 | FIG. 2 | FIG. 2 | FIG. 2 | FIG. 2 | FIG. 2 | FIG. 2 | FIG. 2 | FIG. 2 | FIG. 2 | FIG. 2 | FIG. 2 | FIG. 2 | FIG. 2 |
| D1/TW | 0.100 | 0.080 | 0.067 | 0.050 | 0.100 | 0.150 | 0.183 | 0.217 | 0.150 | 0.150 | 0.150 | 0.150 | 0.150 | 0.150 |
| D2/D1 | 1.00 | 1.50 | 2.00 | 3.00 | 2.00 | 2.00 | 2.00 | 2.00 | 1.33 | 2.33 | 3.00 | 2.00 | 2.00 | 2.00 |
| Dg/TW | 0.20 | 0.20 | 0.20 | 0.20 | 0.30 | 0.45 | 0.55 | 0.65 | 0.35 | 0.50 | 0.60 | 0.45 | 0.45 | 0.45 |
| W1/TW | 0.100 | 0.100 | 0.100 | 0.100 | 0.100 | 0.100 | 0.100 | 0.100 | 0.100 | 0.100 | 0.100 | 0.100 | 0.100 | 0.100 |
| W2/W1 | 1.00 | 1.00 | 1.00 | 1.00 | 1.00 | 1.00 | 1.00 | 1.00 | 1.00 | 1.00 | 1.00 | 1.00 | 1.00 | 1.00 |
| P1/TL | - | 0.020 | 0.020 | 0.020 | 0.020 | 0.020 | 0.020 | 0.020 | 0.020 | 0.020 | 0.020 | 0.030 | 0.040 | 0.050 |
| P2/TL | - | 0.020 | 0.020 | 0.020 | 0.020 | 0.020 | 0.020 | 0.020 | 0.020 | 0.020 | 0.020 | 0.030 | 0.040 | 0.050 |
| L1/P1 | - | 0.20 | 0.20 | 0.20 | 0.20 | 0.20 | 0.20 | 0.20 | 0.20 | 0.20 | 0.20 | 0.20 | 0.20 | 0.20 |
| L2/P2 | - | 0.20 | 0.20 | 0.20 | 0.20 | 0.20 | 0.20 | 0.20 | 0.20 | 0.20 | 0.20 | 0.20 | 0.20 | 0.20 |
| L2/L1 | - | 1.00 | 1.00 | 1.00 | 1.00 | 1.00 | 1.00 | 1.00 | 1.00 | 1.00 | 1.00 | 1.00 | 1.00 | 1.00 |
| φ/P1 | - | 0.20 | 0.20 | 0.20 | 0.20 | 0.20 | 0.20 | 0.20 | 0.20 | 0.20 | 0.20 | 0.20 | 0.20 | 0.20 |
| A1/Sa | 0.100 | 0.020 | 0.020 | 0.020 | 0.020 | 0.020 | 0.020 | 0.020 | 0.020 | 0.020 | 0.020 | 0.020 | 0.020 | 0.020 |
| A2/Sa | 0.100 | 0.020 | 0.020 | 0.020 | 0.020 | 0.020 | 0.020 | 0.020 | 0.020 | 0.020 | 0.020 | 0.020 | 0.020 | 0.020 |
| A1+A2 > Sa | 0.200 | 0.040 | 0.040 | 0.040 | 0.040 | 0.040 | 0.040 | 0.040 | 0.040 | 0.040 | 0.040 | 0.040 | 0.040 | 0.040 |
| DRY PERFORMANCE | 100 | 104 | 105 | 106 | 105 | 102 | 102 | 102 | 102 | 102 | 102 | 102 | 102 | 102 |
| WET PERFORMANCE | 100 | 99 | 100 | 101 | 101 | 100 | 100 | 100 | 100 | 100 | 101 | 102 | 102 | 102 |

FIG. 7

| | EXAMPLE 14 | EXAMPLE 15 | EXAMPLE 16 | EXAMPLE 17 | EXAMPLE 18 | EXAMPLE 19 | EXAMPLE 20 | EXAMPLE 21 | EXAMPLE 22 | EXAMPLE 23 | EXAMPLE 24 | EXAMPLE 25 |
|---|---|---|---|---|---|---|---|---|---|---|---|---|
| CONFIGURATION OF CIRCUMFERENTIAL GROOVE | FIG. 2 | FIG. 2 | FIG. 2 | FIG. 2 | FIG. 2 | FIG. 2 | FIG. 2 | FIG. 2 | FIG. 2 | FIG. 2 | FIG. 2 | FIG. 2 |
| D1/TW | 0.150 | 0.150 | 0.150 | 0.150 | 0.150 | 0.150 | 0.150 | 0.150 | 0.150 | 0.150 | 0.150 | 0.150 |
| D2/D1 | 2.00 | 2.00 | 2.00 | 2.00 | 2.00 | 2.00 | 2.00 | 2.00 | 2.00 | 2.00 | 2.00 | 2.00 |
| Dg/TW | 0.45 | 0.45 | 0.45 | 0.45 | 0.45 | 0.45 | 0.45 | 0.45 | 0.45 | 0.45 | 0.45 | 0.45 |
| W1/TW | 0.050 | 0.040 | 0.033 | 0.040 | 0.040 | 0.040 | 0.040 | 0.050 | 0.034 | 0.030 | 0.040 | 0.040 |
| W2/W1 | 1.00 | 1.00 | 1.00 | 1.00 | 1.00 | 1.00 | 1.00 | 1.00 | 1.00 | 1.00 | 1.00 | 1.00 |
| P1/TL | 0.040 | 0.040 | 0.040 | 0.040 | 0.040 | 0.040 | 0.040 | 0.040 | 0.040 | 0.040 | 0.040 | 0.040 |
| P2/TL | 0.040 | 0.040 | 0.040 | 0.040 | 0.040 | 0.040 | 0.040 | 0.040 | 0.040 | 0.040 | 0.040 | 0.040 |
| L1/P1 | 0.40 | 0.50 | 0.60 | 0.50 | 0.50 | 0.50 | 0.50 | 0.50 | 0.50 | 0.50 | 0.43 | 0.38 |
| L2/P2 | 0.40 | 0.50 | 0.60 | 0.50 | 0.50 | 0.50 | 0.50 | 0.50 | 0.50 | 0.50 | 0.43 | 0.38 |
| L2/L1 | 1.00 | 1.00 | 1.00 | 1.00 | 1.00 | 1.00 | 1.00 | 1.00 | 1.00 | 1.00 | 1.00 | 1.00 |
| φ/P1 | 0.20 | 0.20 | 0.20 | 0.30 | 0.40 | 0.50 | 0.60 | 0.50 | 0.50 | 0.50 | 0.50 | 0.50 |
| A1/Sa | 0.020 | 0.020 | 0.020 | 0.020 | 0.020 | 0.020 | 0.020 | 0.025 | 0.017 | 0.015 | 0.017 | 0.015 |
| A2/Sa | 0.020 | 0.020 | 0.020 | 0.020 | 0.020 | 0.020 | 0.020 | 0.025 | 0.017 | 0.015 | 0.017 | 0.015 |
| A1+A2 > Sa | 0.040 | 0.040 | 0.040 | 0.040 | 0.040 | 0.040 | 0.040 | 0.050 | 0.034 | 0.030 | 0.034 | 0.030 |
| DRY PERFORMANCE | 104 | 104 | 104 | 104 | 104 | 104 | 104 | 102 | 103 | 103 | 103 | 103 |
| WET PERFORMANCE | 104 | 104 | 104 | 104 | 104 | 104 | 104 | 103 | 103 | 101 | 103 | 101 |

FIG. 8

CONVENTIONAL EXAMPLE

TIRE

CROSS-REFERENCE TO RELATED APPLICATIONS

This application claims priority pursuant to 35 U.S.C. 119(a) to Japan Patent Application No. 2020-207621, filed Dec. 15, 2020, which application is incorporated herein by reference in its entirety.

TECHNICAL FIELD

The technology relates to a tire and particularly relates to a tire that can provide dry performance and wet performance of a tire in a compatible manner.

BACKGROUND

Racing tires used both for public road running and for circuit running are required to include peripheral grooves in a tread contact surface in order to ensure wet performance of the tire. As a known tire employing the structure as described above, a technology described in U.S. Pat. No. 7,140,410 is known.

SUMMARY

The technology provides a tire that can provide dry performance and wet performance of a tire in a compatible manner.

An embodiment of the technology provides a tire comprising a mounting direction indicator indicating a tire mounting direction with respect to a vehicle, the tire comprising a first circumferential groove and a second circumferential groove extending intermittently or continuously in a tire circumferential direction, the second circumferential groove being located further on an inner side than the first circumferential groove in a vehicle width direction in a state in which the tire is mounted on the vehicle, and a distance D1 from a tire equatorial plane to a groove center line of the first circumferential groove and a distance D2 from the tire equatorial plane to a groove center line of the second circumferential groove having a relationship D1<D2.

In the tire according to an embodiment of the technology, the distance D2 of the second circumferential groove on the inner side in the vehicle width direction is greater than the distance D1 of the first circumferential groove on the outer side in the vehicle width direction (D1<D2), and thus on a tread surface, the first and second circumferential grooves are disposed on the inner side in the vehicle width direction in a biased manner. Thus, the groove area ratio of the inner region of the tread surface in the vehicle width direction is increased, improving the wet performance of the tire, while the ground contact area ratio of the outer region in the vehicle width direction is increased, improving the traction performance of the tire on dry road surfaces. This has an advantage in that the tire wet performance and the traction performance on dry road surfaces are improved in a compatible manner.

BRIEF DESCRIPTION OF DRAWINGS

FIG. 7 is a table indicating the results of performance tests of tires according to embodiments of the technology.

FIG. 8 is a table showing the results of performance tests of tires according to embodiments of the technology.

DETAILED DESCRIPTION

Embodiments of the technology will be described in detail below with reference to the drawings. Note that embodiments of the technology are not limited to the embodiments. Additionally, constituents of the embodiments include constituents that are substitutable and are obviously substitutes while maintaining consistency with the embodiments of the technology. Additionally, a plurality of modified examples described in the embodiments can be combined in a discretionary manner within the scope apparent to one skilled in the art.

Tire

Figure 1:
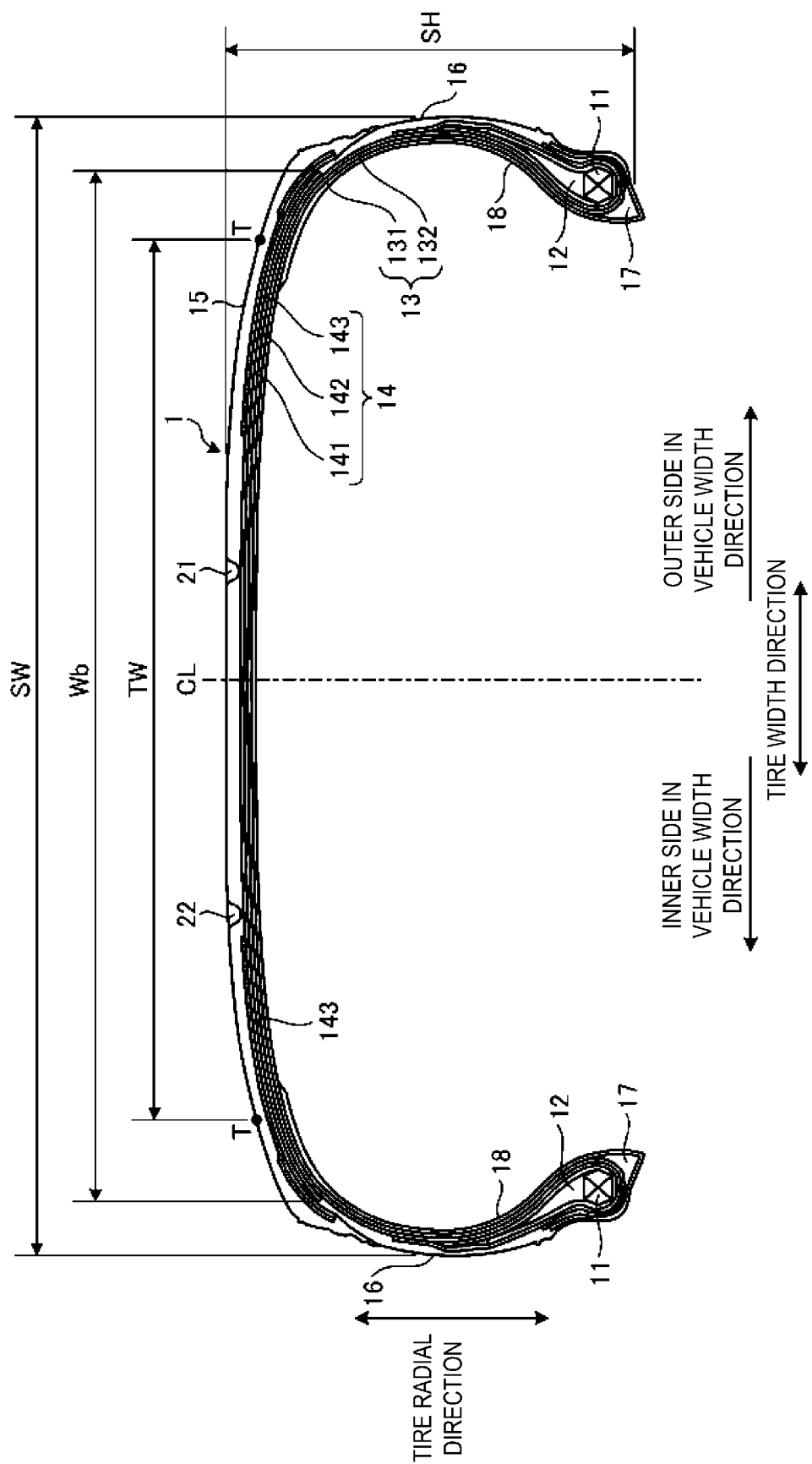
FIG. 1 is a cross-sectional view in a tire meridian direction illustrating a tire according to an embodiment of the technology.

FIG. 1 is a cross-sectional view in a tire meridian direction illustrating a tire according to an embodiment of the technology. The same drawing illustrates a cross-sectional view of a half region in a tire radial direction. In this embodiment, a racing pneumatic radial tire used both for public road running and for circuit running will be described as an example of the tire.

In the same drawing, a cross section in the tire meridian direction is defined as a cross section of the tire taken along a plane that includes a tire rotation axis (not illustrated). Further, a tire equatorial plane CL is defined as a plane perpendicular to the tire rotation axis through a midpoint between measurement points in a tire cross-sectional width defined by JATMA (the Japan Automobile Tyre Manufacturers Association, Inc.). Additionally, a tire width direction is defined as a direction parallel to the tire rotation axis, and the tire radial direction is defined as a direction perpendicular to the tire rotation axis.

Furthermore, an inner side in a vehicle width direction and an outer side in the vehicle width direction are defined with respect to the vehicle width direction in a case where the tire is mounted on a vehicle. Additionally, left and right regions demarcated by the tire equatorial plane are defined as an outer region in the vehicle width direction and an inner region in the vehicle width direction. Furthermore, the tire includes a mounting direction indicator (not illustrated) that indicates the tire mounting direction with respect to a vehicle. The mounting direction indicator, for example, is composed of a mark or recesses/protrusions on a sidewall portion of the tire. For example, Economic Commission for Europe Regulation 30 (ECE R30) stipulates that the vehicle mounting direction indicator be provided on the sidewall portion on the outer side in the vehicle width direction in a case where the tire is mounted on a vehicle.

A tire 1 includes an annular structure with the tire rotation axis serving as the center, and includes a pair of bead cores 11, 11, a pair of bead fillers 12, 12, a carcass layer 13, a belt layer 14, a tread rubber 15, a pair of sidewall rubbers 16, 16, a pair of rim cushion rubbers 17, 17, and an innerliner 18 (see FIG. 1).

The pair of bead cores 11, 11 each include one or more of bead wires made of steel and made by being wound annularly multiple times, and the pair of bead cores 11, 11 are embedded in bead portions and constitute cores of the bead portions on the left and right. The pair of bead fillers 12, 12 are respectively disposed on an outer circumference of the pair of bead cores 11, 11 in the tire radial direction and reinforce the bead portions.

The carcass layer 13 includes a single layer structure made of one carcass ply, or a multilayer structure made of a plurality of carcass plies being layered, and the carcass layer 13 extends in a toroidal shape between the bead cores 11, 11 on the left and right, and constitutes the backbone of the tire. Additionally, both end portions of the carcass layer 13 are wound and turned back toward an outer side in the tire width direction to wrap the bead cores 11 and the bead fillers 12, and are fixed. Moreover, the carcass ply of the carcass layer 13 is made by covering a plurality of carcass cords made of steel or an organic fiber material (for example, aramid, nylon, polyester, rayon, or the like) with a coating rubber and performing a rolling process on the carcass cords, and has a cord angle (defined as an inclination angle in a longitudinal direction of the carcass cords with respect to a tire circumferential direction) of 80 degrees or more and 100 degrees or less.

Note that in the configuration in FIG. 1, the carcass layer 13 includes a multilayer structure made by layering two carcass plies 131, 132. However, no such limitation is intended, and the carcass layer 13 may be constituted by layering three or more carcass plies or may include a single layer structure made of one carcass ply (not illustrated).

The belt layer 14 is a multilayer structure including a plurality of belt plies 141 to 143 and is disposed around the periphery of the carcass layer 13. The belt plies 141 to 143 include a pair of cross belts 141, 142 and a pair of belt covers 143, 143.

The pair of cross belts 141, 142 are made by covering a plurality of belt cords made of steel or an organic fiber material with a coating rubber and performing a rolling process on the belt cords, and each have a cord angle with an absolute value of 15 degrees or more and 55 degrees or less. Further, the pair of cross belts 141, 142 have cord angles (defined as inclination angles in a longitudinal direction of the belt cords with respect to the tire circumferential direction) of opposite signs relative to each other and are layered such that the longitudinal directions of the belt cords intersect each other (so-called crossply structure). Furthermore, the pair of cross belts 141, 142 are disposed layered on an outer side in the tire radial direction of the carcass layer 13.

The belt cover 143 is made by coating belt cover cords made from steel or an organic fiber material with a coating rubber and has a cord angle, as an absolute value, of 0° or more and 10° or less. Additionally, the belt cover 143 is, for example, a strip material formed by coating one or a plurality of belt cover cords with a coating rubber, where the strip material is formed by winding the strip material spirally on the outer circumferential surfaces of the cross belts 141 and 142 multiple times in the tire circumferential direction. Additionally, in the configuration in FIG. 1, the belt covers 143, 143 are disposed covering lateral edges of the cross belts 141, 142 from the outer side in the tire radial direction. However, no such limitation is intended, and the belt cover 143 may be disposed in such a manner as to completely cover the cross belts 141, 142 (not illustrated).

The tread rubber 15 is disposed in the outer circumferences in the tire radial direction of the carcass layer 13 and the belt layer 14 and constitutes a tread portion of the tire. The pair of sidewall rubbers 16, 16 are disposed on an outer side in the tire width direction of the carcass layer 13 and constitute sidewall portions on the left and right, respectively. The pair of rim cushion rubbers 17, 17 extend from an inner side in the tire radial direction of the bead cores 11, 11 on the left and right and turned back portions of the carcass layer 13 toward the outer side in the tire width direction, and constitute rim fitting surfaces of the bead portions. The innerliner 18 is an air permeation preventing layer disposed on the tire inner surface and covering the carcass layer 13, and suppresses oxidation caused by exposure of the carcass layer 13 and also prevents leaking of the air in the tire.

Additionally, in FIG. 1, a tire cross-sectional height SH has the relationship $0.20 \leq SH/SW \leq 0.70$ and preferably has the relationship $0.30 \leq SH/SW \leq 0.60$, with respect to a total tire width SW. In addition, a tire ground contact width TW has the relationship $0.90 \leq TW/SW \leq 0.98$ and preferably has the relationship $0.94 \leq TW/SW \leq 0.96$, with respect to the total tire width SW. Additionally, a belt width Wb of the cross belt 141, which is wide, has the relationship $0.98 \leq Wb/TW \leq 1.10$ and preferably has the relationship $1.00 \leq Wb/TW \leq 1.0.5$, with respect to the tire ground contact width TW.

The tire cross-sectional height SH is a distance equal to half of a difference between a tire outer diameter and a rim diameter, and is measured when the tire is mounted on a specified rim, inflated to a specified internal pressure, and in an unloaded state.

The total tire width SW is measured as a linear distance (including all portions such as letters and patterns on the tire side surface) between the sidewalls when the tire is mounted on a specified rim, inflated to a specified internal pressure, and in an unloaded state.

The tire ground contact width TW is measured as a maximum linear distance in the tire axial direction of a contact surface of the tire and a flat plate when the tire is mounted on a specified rim, inflated to a specified internal pressure, placed perpendicular to the flat plate in a static state, and loaded with a load corresponding to a specified load.

A tire ground contact edge T is defined as a maximum width position in the tire axial direction of the contact surface between the tire and a flat plate when the tire is mounted on a specified rim, inflated to a specified internal pressure, placed perpendicular to the flat plate in a static state, and loaded with a load corresponding to a specified load.

The width of a belt ply is the distance in the direction of the tire rotation axis between the left and right end portions of each belt ply, measured when the tire is mounted on a specified rim, inflated to a specified internal pressure, and in an unloaded state.

"Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a tire for a passenger vehicle, the specified internal pressure is an air pressure of 180 kPa, and the specified load is 88% of the maximum load capacity.

Tread Surface

Figure 2:
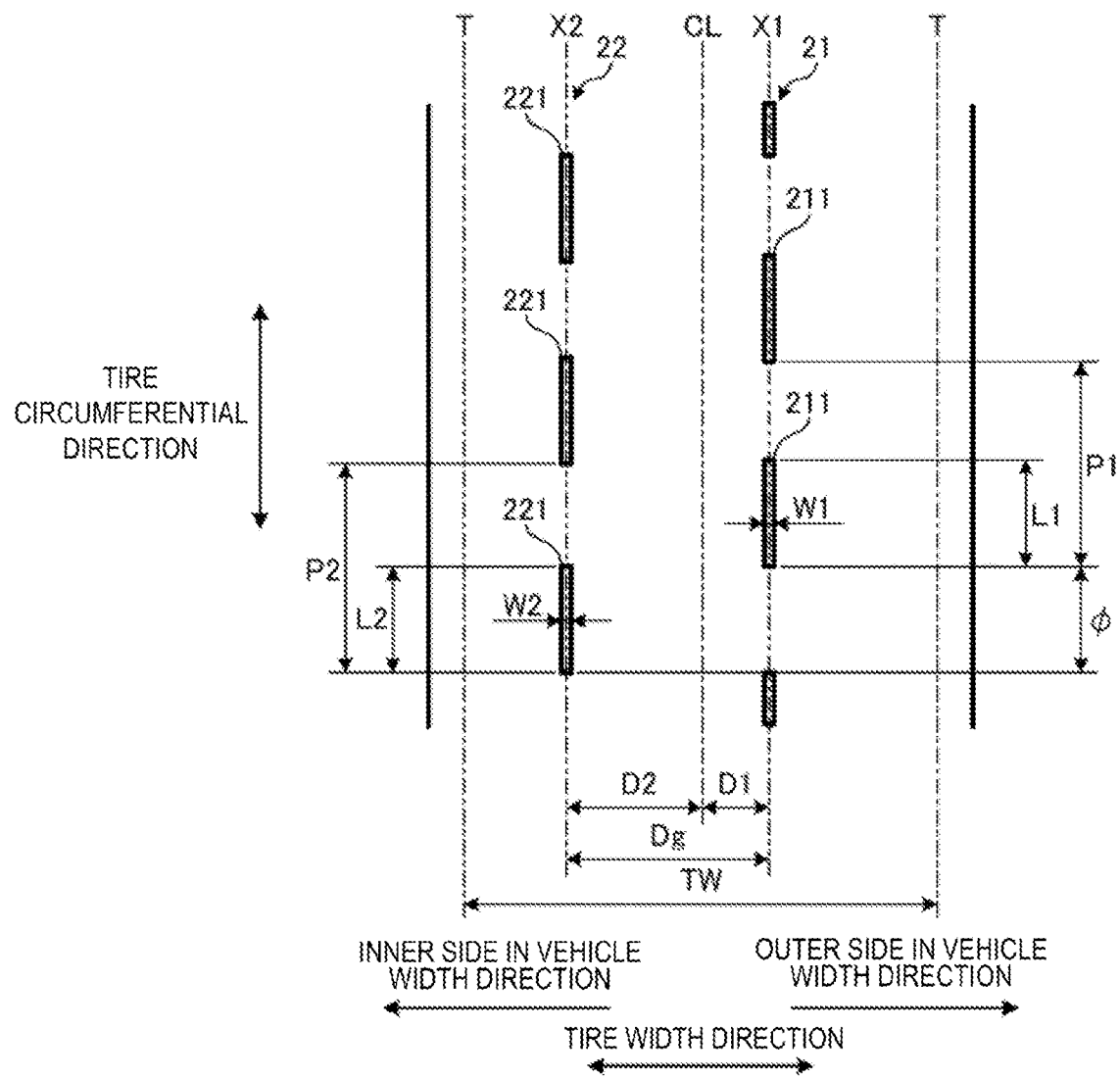
FIG. 2 is a plan view illustrating a tread surface of the tire illustrated in FIG. 1.
Figure 3:
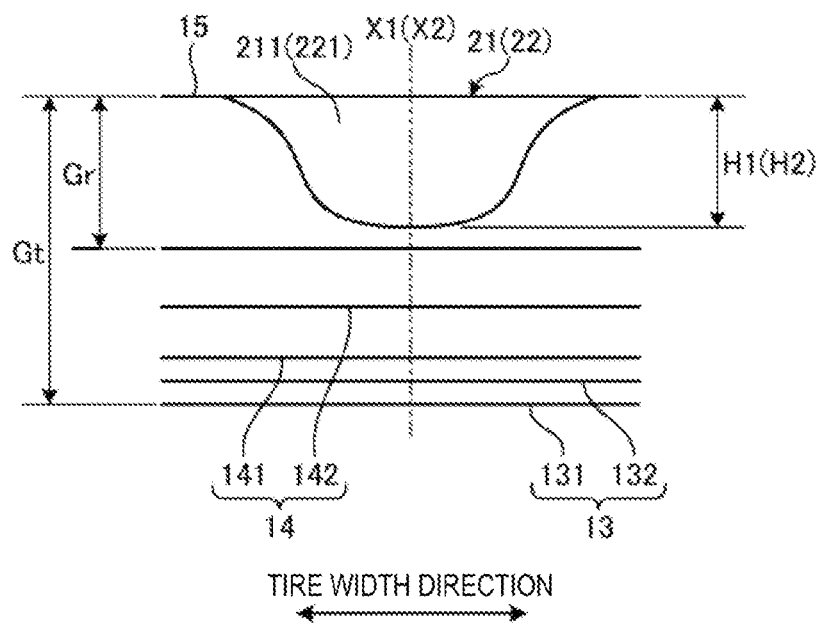
FIG. 3 is an explanatory diagram illustrating circumferential grooves illustrated in FIG. 2.

FIG. 2 is a plan view illustrating a tread surface of the tire 1 illustrated in FIG. 1. FIG. 3 is an explanatory diagram illustrating a circumferential groove 21 (22) illustrated in FIG. 2. In the drawings, "tire circumferential direction" refers to a direction around the tire rotation axis. Additionally, reference sign T denotes a tire ground contact edge, and dimension symbol TW denotes a tire ground contact width.

As illustrated in FIG. 2, the tire 1 is provided with first and second circumferential grooves 21, 22 in the tread surface. Additionally, as described below, the tire 1 includes no other circumferential grooves or dimples in the tread surface.

The circumferential grooves 21, 22 need to extend intermittently or continuously in the tire circumferential direction. In the configuration illustrated in FIG. 2, each of the first and second circumferential grooves 21, 22 includes a plurality of groove portions 211, 221 arranged discontinuously in a row in the tire circumferential direction and extend intermittently in the tire circumferential direction.

Specifically, the plurality of groove portions 211 constituting the first circumferential groove 21 are arranged discontinuously in a row in the tire circumferential direction along a predetermined imaginary line X1 that is parallel with a tire equatorial plane CL. Additionally, the distance of the center of gravity of all of the groove portions 211 with respect to the imaginary line X1 (dimension symbol omitted in the drawings) is in the range of less than 0.5% of the tire ground contact width TW. In other words, a group of groove portions 211 that satisfies the conditions for the distance described above with respect to the predetermined imaginary line X1 constitutes one row of the first circumferential groove 21. In addition, the imaginary line X1 is defined as the groove center line of the first circumferential groove 21.

Similarly, the plurality of groove portions 221 that constitute the second circumferential groove 22 are arranged discontinuously in a row in the tire circumferential direction along a predetermined imaginary line X2 that is parallel with the tire equatorial plane CL. Additionally, the distance of the center of gravity of all of the groove portions 221 with respect to the imaginary line X2 (dimension symbol omitted in the drawings) is in the range of less than 0.5% of the tire ground contact width TW. In other words, a group of groove portions 221 that satisfies the conditions for the distance described above with respect to the predetermined imaginary line X2 constitutes one row of the second circumferential groove 22. Furthermore, this imaginary line X2 is defined as the groove center line of the second circumferential groove 22.

The distance of the center of gravity of the groove portion 211 and the distance of the center of gravity of the groove portion 221 are measured when the tire is mounted on a specified rim, inflated to a specified internal pressure, and in an unloaded state.

Additionally, a maximum groove width W1 of the first circumferential groove 21 and a maximum groove width W2 of the second circumferential groove 22 have the relationships $0.020 \leq W1/TW \leq 0.080$ and $0.020 \leq W2/TW \leq 0.080$ with respect to the tire ground contact width TW. In addition, the maximum groove widths W1, W2 of the first and second circumferential grooves 21, 22 are in the range of 4.0 mm or more and 16 mm or less, and preferably in the range of 6.0 mm or more and 10 mm or less. Additionally, the maximum groove widths W1, W2 of the first and second circumferential grooves 21, 22 have the relationship $0.90 \leq W2/W1 \leq 1.10$, and preferably have the relationship $0.95 \leq W2/W1 \leq 1.05$.

The maximum groove widths W1, W2 of the circumferential grooves 21, 22 are each measured as a distance between opposite groove walls in a groove opening portion when the tire is mounted on a specified rim, inflated to a specified internal pressure, and in an unloaded state. In a case where the circumferential grooves 21, 22 extend intermittently in the tire circumferential direction as illustrated in FIG. 2, the maximum groove width is measured as the maximum value of the groove widths of all of the groove portions 211, 221 constituting the single circumferential groove 21, 22.

Additionally, in FIG. 3, the maximum groove depth H1 of the first circumferential groove 21 and the maximum groove depth H2 of the second circumferential groove 22 are in the range of 2.5 mm or more and 5.0 mm or less, and preferably in the range of 2.8 mm or more and 4.0 mm or less. Additionally, the maximum groove depths H1, H2 of the first and second circumferential grooves 21, 22 have a relationship $0.90 \leq H2/H1 \leq 1.10$, and preferably have a relationship $0.95 \leq H2/H1 \leq 1.05$.

The maximum groove depths H21, H22 of the circumferential grooves 21, 22 are each measured as a distance from the tread contact surface to the groove bottom when the tire is mounted on a specified rim, inflated to a specified internal pressure, and in an unloaded state. Additionally, in a configuration in which a groove bottom includes partial recess/protrusion portions or a sipe, the groove depth is measured excluding the partial recess/protrusion portions or the sipe.

Additionally, in FIG. 3, the maximum groove depths H1, H2 of the first and second circumferential grooves 21, 22 are in the range of 60% or more and 85% or less and preferably in the range of 63% or more and 70% or less with respect to the gauge Gr of the tread rubber 15 on the groove center line of the circumferential grooves 21, 22. Additionally, the gauge Gr of the tread rubber 15 is in the range of 30% or more and 60% or less and preferably in the range of 35% or more and 55% or less with respect to the total gauge Gt of the tread portion on the groove center lines of the circumferential grooves 21, 22.

The gauge Gr of the tread rubber 15 is measured as a distance from a tread profile to the outer circumferential surface of the cross belt 142 and does not include the gauge of the coating rubber (not illustrated) of the cross belt 142.

The total gauge Gt of the tread portion is measured as a distance from the tread profile to the tire inner surface and does not include the gauge of the tread surface or partial recess/protrusion portions formed on the tire inner surface.

Additionally, in FIG. 2, the groove area A1 of the first circumferential groove 21 and the groove area A2 (not illustrated) of the second circumferential groove 22 have the relationships $0.015 \leq A1/Sa \leq 0.100$ and $0.015 \leq A2/Sa \leq 0.100$, and preferably have the relationships $0.015 \leq A1/Sa \leq 0.020$ and $0.015 \leq A2/Sa \leq 0.020$, with respect to an area Sa of the tire ground contact region. Additionally, the groove area A1 of the first circumferential groove 21 and the groove area A2 of the second circumferential groove 22 have a relationship $0.90 \leq A1/A2 \leq 1.10$, and preferably have a relationship $0.95 \leq A1/A2 \leq 1.05$.

The groove area is the opening area of a groove in the tread contact surface, and is measured at a contact surface between the tire and a flat plate when the tire is mounted on a specified rim, inflated to a specified internal pressure, placed vertically on the flat plate in a static state, and loaded with a load corresponding to a specified load. Additionally, in a case where the circumferential groove 21, 22 extends intermittently in the tire circumferential direction as in FIG. 2, the groove area A1, A2 of the circumferential groove 21, 22 is calculated as the sum of the opening areas of the plurality of groove portions 211, 221 constituting the circumferential groove 21, 22.

The area Sa of the tire ground contact region is the area of the entire region of the tread contact surface defined by left and right tire ground contact edges T, and is defined as an area including both the groove and the land portion.

Additionally, in the configuration in FIG. 2, each of the first and second circumferential grooves 21, 22 includes a plurality of groove portions 211, 221 arranged discontinuously in a row in the tire circumferential direction, as described above. Additionally, each of the opening areas of the groove portions 211, 221 constituting the first and second circumferential grooves 21, 22 is in the range of 200 mm$^2$ or more and 340 mm$^2$ or less, and preferably in the range of 240 mm$^2$ or more and 300 mm$^2$ or less.

Additionally, preferably the tire 1 has a tire ground contact region that does not include other grooves or recess portions each having an opening area of more than 40 mm$^2$, preferably more than 20 mm$^2$, that is, grooves or recess portions other than the circumferential grooves 21, 22. In other words, the regions other than the regions where the circumferential grooves 21, 22 are disposed may be provided in the tire ground contact region with wear indicators (not illustrated) each including a recess portion or groove with an opening area smaller than that indicated in the above-described conditions, for example, a small hole. Additionally, the groove area ratio of the tire ground contact region is in the range of 3.0% or more and 5.0% or less, and preferably in the range of 3.2% or more and 3.8% or less.

For example, in the configuration in FIG. 2, the tire ground contact region includes only the first and second circumferential grooves 21, 22, and a wear indicator (not illustrated) is formed in the groove bottoms of predetermined ones of the circumferential grooves 21, 22. Additionally, the regions other than the regions where the circumferential grooves 21 and 22 are disposed include a plane road contact surface with no grooves or sipes. Thus, in the configuration in FIG. 2, the groove area across the tire ground contact region is equal to the sum of the groove area A1 of the first circumferential groove 21 and the groove area A2 of the second circumferential groove 22. Additionally, the groove area ratio of the tire ground contact region is in the range $0.030 \leq (A1+A2)/Sa \leq 0.200$.

The groove area ratio is defined as the ratio between the sum of the groove areas of the grooves disposed in a predetermined region and the area of the predetermined region.

Additionally, in the configuration in FIG. 2, a pitch length P1 of the groove portion 211 of the first circumferential groove 21 and a pitch length P2 of the groove portion 221 of the second circumferential groove 22 have the relationships $0.030 \leq P1/TL \leq 0.060$ and $0.030 \leq P2/TL \leq 0.060$ with respect to a tire circumferential length TL (not illustrated). In addition, the pitch length P1 of the first circumferential groove 211 of the first circumferential groove 21 and the pitch length P2 of the second circumferential groove 221 of the second circumferential groove 22 have a relationship $0.90 \leq P1/P2 \leq 1.10$, and preferably have a relationship $0.95 \leq P1/P2 \leq 1.05$.

The tire circumferential length TL is measured as the maximum circumferential length of the tread surface when the tire is mounted on a specified rim, inflated to a specified internal pressure, and in an unloaded state.

Additionally, in FIG. 2, the maximum circumferential length L1 of the groove portion 211 of the first circumferential groove 21 and the maximum circumferential length L2 of the groove portions 221 of the second circumferential groove 22 have the relationships $0.30 \leq L1/P1 \leq 0.60$ and $0.30 \leq L2/P2 \leq 0.60$, and preferably have the relationships $0.45 \leq L1/P1 \leq 0.55$ and $0.45 \leq L2/P2 \leq 0.55$ with respect to the pitch length P1 of the groove portion 211 of the first circumferential groove 21 and the pitch length P2 of the groove portion 221 of the second circumferential groove 22. In addition, the maximum circumferential length L1 of the groove 211 of the first circumferential groove 21 and the maximum circumferential length L2 of the groove 221 of the second circumferential groove 22 have a relationship $0.90 \leq L2/L1 \leq 1.10$, and preferably have a relationship $0.95 \leq L2/L1 \leq 1.05$.

The maximum circumferential lengths L1, L2 of the groove portions 211, 221 of the circumferential grooves 21, 22 are each measured as a circumferential distance in the groove opening portion when the tire is mounted on a specified rim, inflated to a specified internal pressure, and in an unloaded state.

Additionally, in FIG. 2, the maximum circumferential length L1 of the groove portion 211 of the first circumferential groove 21 and the maximum circumferential length L2 of the groove portion 221 of the second circumferential groove 22 have the relationships $2.00 \leq L1/W1 \leq 8.00$ and $2.00 \leq L2/W2 \leq 8.00$, and preferably have the relationships $4.00 \leq L1/W1 \leq 6.00$ and $4.00 \leq L2/W2 \leq 6.00$ with respect to the maximum groove width W1 of the first circumferential groove 21 and the maximum groove width W2 of the second circumferential groove 22.

Additionally, in FIG. 2, the phase difference φ between the groove portion 211 of the first circumferential groove 21 and the groove portion 221 of the second circumferential groove 22 has the relationship $0.25 \leq \varphi/P1 \leq 0.75$ and preferably has the relationship $0.40 \leq \varphi/P1 \leq 0.50$ with respect to the pitch length P1 of the groove portion 211 of the first circumferential groove 21.

For example, in the configuration in FIG. 2, the groove portions 211, 221 have a rectangular shape or an elliptical shape that is elongated in the tire circumferential direction. Additionally, the groove portions 211 of the first circumferential groove 21 and the groove portions 221 of the second circumferential groove 22 are arranged in a staggered manner in the tire circumferential direction. Specifically, the pitch number of the groove portions 211 of the first circumferential groove 21 and the pitch number of the groove portions 221 of the second circumferential groove 22 are set to be identical, and the maximum circumferential length L1 of the groove portion 211 of the first circumferential groove 21 and the maximum circumferential length L2 of the groove portion 221 of the second circumferential groove 22 are set to be 50% of the pitch length P1 of the groove portion 211 of the first circumferential groove 21 and the pitch length P2 of the groove portion 221 of the second circumferential groove 22. Additionally, the phase difference y between the groove portion 211 of the first circumferential groove 21 and the groove portion 221 of the second circumferential groove 22 is set to be approximately 50% of the pitch length P1 of the groove portion 211 of the first circumferential groove 21.

Asymmetric Arrangement of Circumferential Grooves

In the tire 1, as illustrated in FIG. 2, the first circumferential groove 21 is disposed in an outer region in the vehicle width direction, whereas the second circumferential groove 22 is disposed in an inner region in the vehicle width direction, the outer region and the inner region being demarcated by the tire equatorial plane CL. A distance D1 from the tire equatorial plane CL to the groove center line X1 of the first circumferential groove 21 and a distance D2 from the tire equatorial plane CL to the groove center line X2 of the second circumferential groove 22 have a relationship D1<D2. Thus, the first and second circumferential grooves 21, 22 are disposed asymmetrically with respect to the tire equatorial plane CL. Additionally, the distance D1 of the first circumferential groove 21 and the distance D2 of the second circumferential groove 22 have the relationship $1.11 \leq D2/D1 \leq 2.00$, and preferably have the relationship $1.20 \leq D2/D1 \leq 1.80$.

Additionally, in the configuration in FIG. 2, the circumferential groove 21 on the outer side in the vehicle width direction is disposed closer to the tire equatorial plane CL than the circumferential groove 22 on the inner side in the vehicle width direction. In addition, when the entirety of the tire ground contact region is viewed, the first and second circumferential grooves 21, 22 are disposed on the inner side in the vehicle width direction in a biased manner.

In the configuration described above, the distance D2 of the second circumferential groove on the inner side in the vehicle width direction is greater than the distance D1 of the first circumferential groove on the outer side in the vehicle width direction (D1<D2), and thus on the tread surface, the first and second circumferential grooves 21, 22 are disposed on the inner side in the vehicle width direction in a biased manner. Thus, the groove area ratio of the inner region of the tread surface in the vehicle width direction is increased, improving the wet performance of the tire, while the ground contact area ratio of the outer region in the vehicle width direction is increased, improving the traction performance of the tire on dry road surfaces. Thus, the tire wet performance and the traction performance on dry road surfaces are improved in a compatible manner.

Additionally, in FIG. 2, the distance D1 from the tire equatorial plane CL to the groove center line X1 of the first circumferential groove 21 has the relationship $0.05 \leq D1/TW$ and preferably has the relationship $0.10 \leq D1/TW$, with respect to the tire ground contact width TW. In addition, the distance D2 from the tire equatorial plane CL to the groove center line X2 of the second circumferential groove 22 has the relationship $D2/TW \leq 0.45$ and preferably has the relationship $D2/TW \leq 0.25$, with respect to the tire ground contact width TW. Additionally, a distance Dg in the tire width direction between the groove center line X1 of the first circumferential groove 21 and the groove center line X2 of the second circumferential groove 22 has the relationship 0.10 Dg/TW and preferably has the relationship 0.20 Dg/TW, with respect to the tire ground contact width TW.

The distance D1, the distance D2, and the distance Dg are measured when the tire is mounted on a specified rim, inflated to a specified internal pressure, and in an unloaded state.

Modified Example 1

Figure 4:
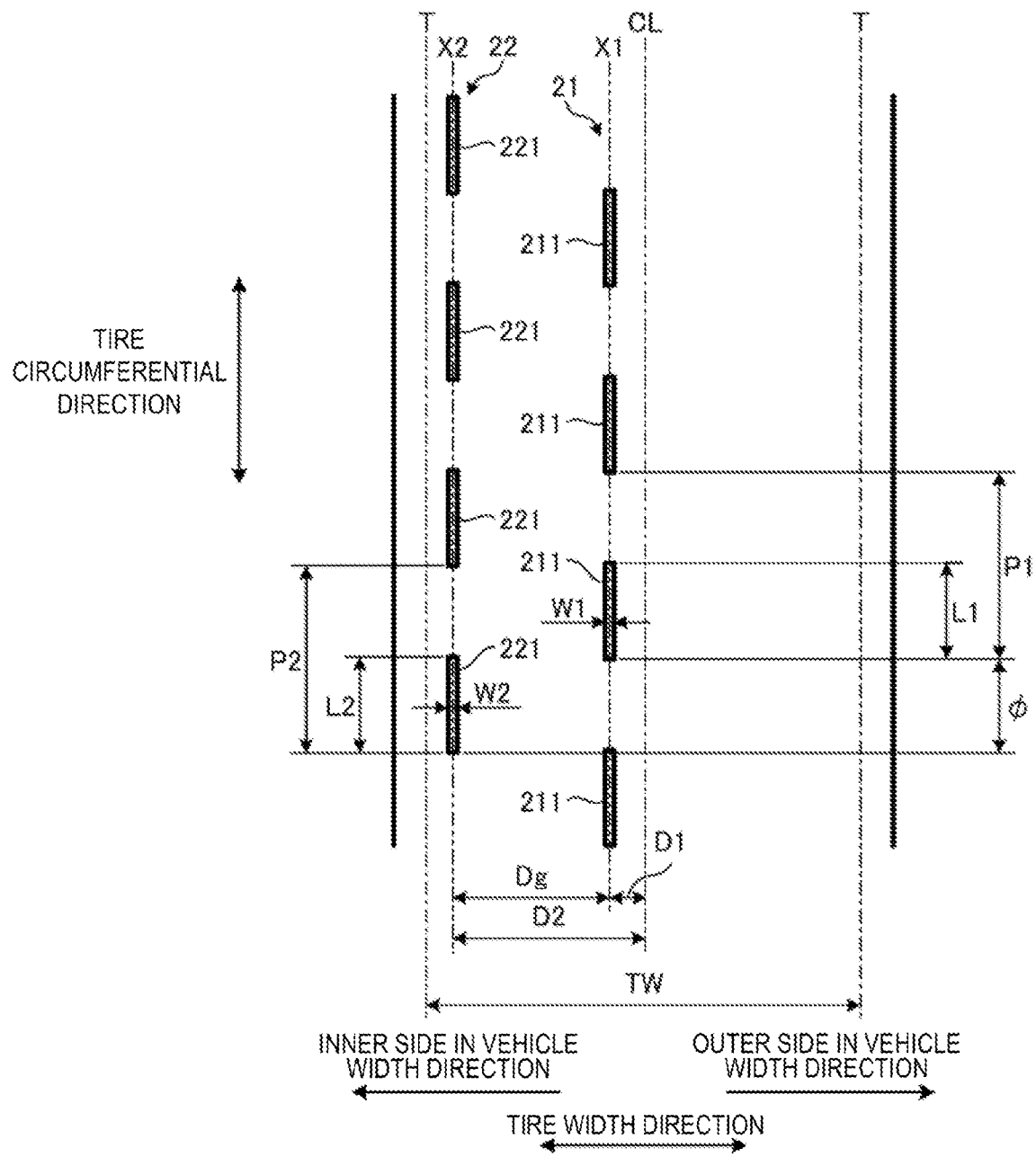
FIG. 4 is an explanatory diagram illustrating a modified example of the tire illustrated in FIG. 2.

FIG. 4 is an explanatory diagram illustrating a modified example of the tire illustrated in FIG. 2. In the same drawing, constituents identical to those in FIG. 2 have identical reference signs, and descriptions thereof will be omitted.

In the configuration in FIG. 2, the first circumferential groove 21 is disposed in an outer region in the vehicle width direction, and the second circumferential groove 22 is disposed in an inner region in the vehicle width direction, the outer region and the inner region being demarcated by the tire equatorial plane CL. Such a configuration is preferable in that the circumferential grooves 21, 22 are disposed in the left and right regions of the tire, efficiently providing both dry steering stability performance and wet steering stability performance of the tire in a compatible manner.

In contrast, in the configuration in FIG. 4, both the first and second circumferential grooves 21, 22 are disposed in the inner region in the vehicle width direction, the inner region being demarcated by the tire equatorial plane CL. Compared with the configuration illustrated in FIG. 2, the configuration as described above can preferably improve the tire wet performance while maintaining the tire traction performance.

Additionally, in FIG. 4, the distance D1 from the tire equatorial plane CL to the groove center line X1 of the first circumferential groove 21 has the relationship $0.05 \leq D1/TW$, and preferably has a relationship such that $0.10 \leq D1/TW$. with respect to the tire ground contact width TW. In addition, the distance D2 from the tire equatorial plane CL to the groove center line X2 of the second circumferential groove 22 has the relationship $D2/TW \leq 0.45$ and preferably has the relationship $D2/TW \leq 0.25$, with respect to the tire ground contact width TW. Additionally, a distance Dg in the tire width direction between the groove center line X1 of the first circumferential groove 21 and the groove center line X2 of the second circumferential groove 22 has the relationship 0.10 Dg/TW and preferably has the relationship 0.20 Dg/TW, with respect to the tire ground contact width TW.

Modified Example 2

Figure 5:
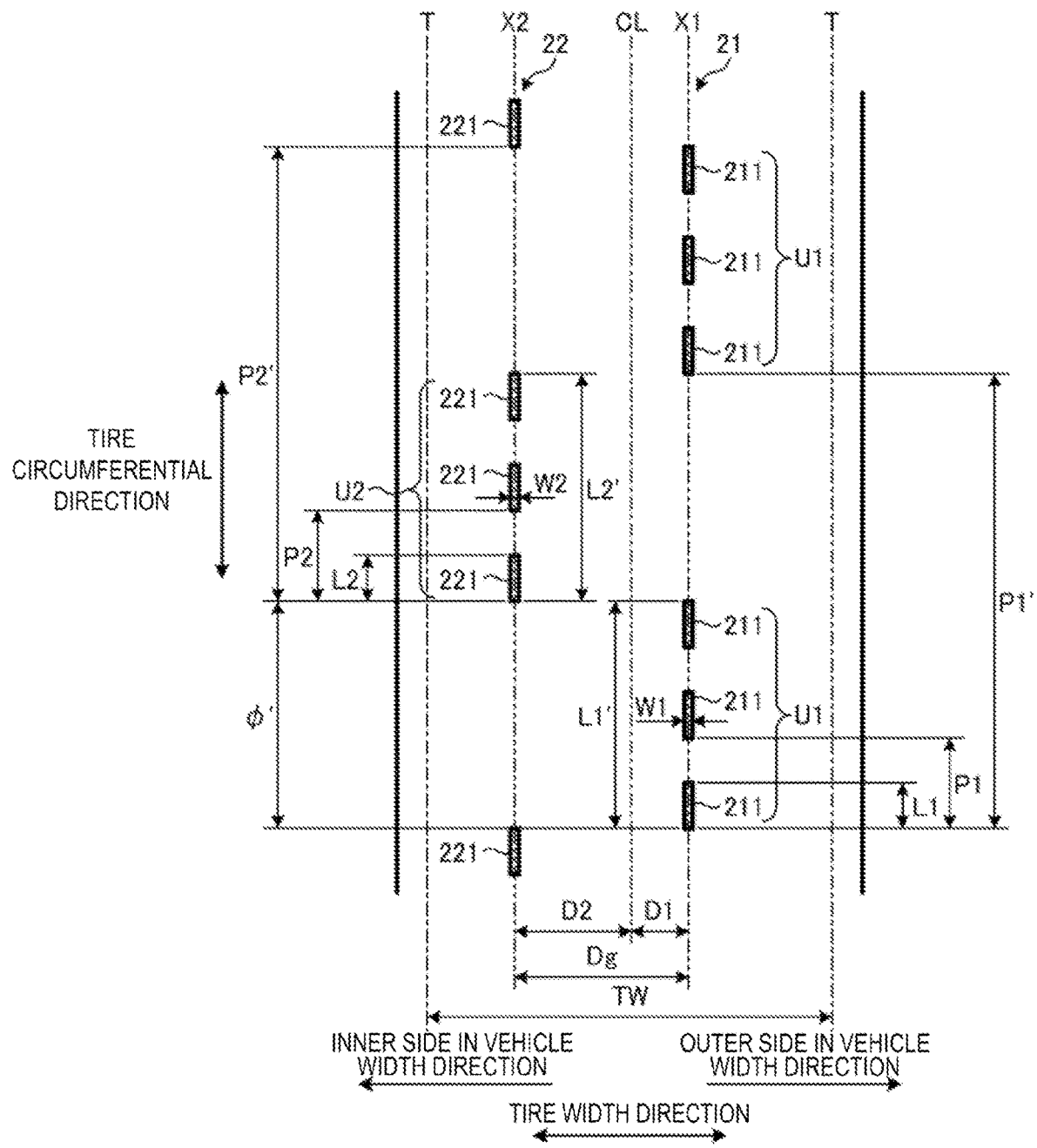
FIG. 5 is an explanatory diagram illustrating a modified example of the tire illustrated in FIG. 2.

FIG. 5 is an explanatory diagram illustrating a modified example of the tire illustrated in FIG. 2. In the same drawing, constituents identical to those in FIG. 2 have identical reference signs, and descriptions thereof will be omitted.

In the configuration illustrated in FIG. 2, the plurality of groove portions 211 constituting the first circumferential groove 21 are arranged with a predetermined pitch length P1 all around the circumference of the tire, and the plurality of groove portions 221 constituting the second circumferential groove 22 are arranged with a predetermined pitch length P2 all around the circumference of the tire. Additionally, the first and second groove portions 211, 221 are arranged in a staggered manner in the tire circumferential direction with a predetermined phase difference φ. Such a configuration can preferably improve the tire wet performance while maintaining the tire traction performance.

In contrast, in the configuration in FIG. 5, the first circumferential groove 21 includes a first groove unit U1 including three or more groove portions 211 arranged with a predetermined pitch length P1 in the tire circumferential direction, and a plurality of first groove units U1 are arranged with a predetermined pitch length P1' in the tire circumferential direction. Similarly, the second circumferential groove 22 includes a second groove unit U2 including three or more groove portions 221 arranged with a predetermined pitch length P2 in the tire circumferential direction, and a plurality of second groove units U2 are arranged with a predetermined pitch length P2' in the tire circumferential direction. Additionally, the first and second groove units U1 and U2 are arranged in a staggered manner in the tire circumferential direction with a predetermined phase difference φ'. Such a configuration can preferably improve the tire traction performance while maintaining the tire wet performance.

In FIG. 5, the pitch length P1' of the first groove unit U1 and the pitch length P2' of the second groove unit U2 have the relationship $0.10 \leq P1'/TL \leq 0.30$ and $0.10 \leq P2'/TL \leq 0.30$ with respect to the tire circumferential length TL (not illustrated). Additionally, the pitch length P1' of the first groove unit U1 and the pitch length P2' of the second groove unit U2 have the relationship $0.90 \leq P1'/P2' \leq 1.10$, and preferably have the relationship $0.95 \leq P1'/P2' \leq 1.05$.

Additionally, in FIG. 5, the maximum circumferential length L1' of the first groove unit U1 and the maximum circumferential length L2' of the second groove unit U2 have the relationship $0.050 \leq L1'/TL \leq 0.100$ and $0.050 \leq L2'/TL \leq 0.100$ with respect to the tire circumferential length TL (not illustrated). In addition, the maximum circumferential length L1' of the first groove unit U1 and the maximum circumferential length L2' of the second groove unit U2 have the relationship $0.90 \leq L2'/L1' \leq 1.10$, and preferably have the relationship $0.95 \leq L2'/L1' \leq 1.05$.

Additionally, in FIG. 5, the maximum circumferential length L1' of the first groove unit U1 and the maximum circumferential length L2' of the second groove unit U2 have the relationships $0.30 \leq L1'/P1' \leq 0.60$ and $0.30 \leq L2'/P2' \leq 0.60$, and preferably have the relationships $0.45 \leq L1'/P1' \leq 0.55$ and $0.45 \leq L2'/P2' \leq 0.55$, with respect to the pitch length P1' of the first groove unit U1 and the pitch length P2' of the second groove unit U2.

In addition, in FIG. 5, a phase difference φ' between the first groove unit U1 and the second groove unit U2 has the relationship $0.25 \leq \varphi'/P1' \leq 0.75$ and preferably has the relationship $0.40 \leq \varphi'/P1' \leq 0.50$, with respect to the pitch length P1' of the first groove unit U1.

Modified Example 3

Figure 6:
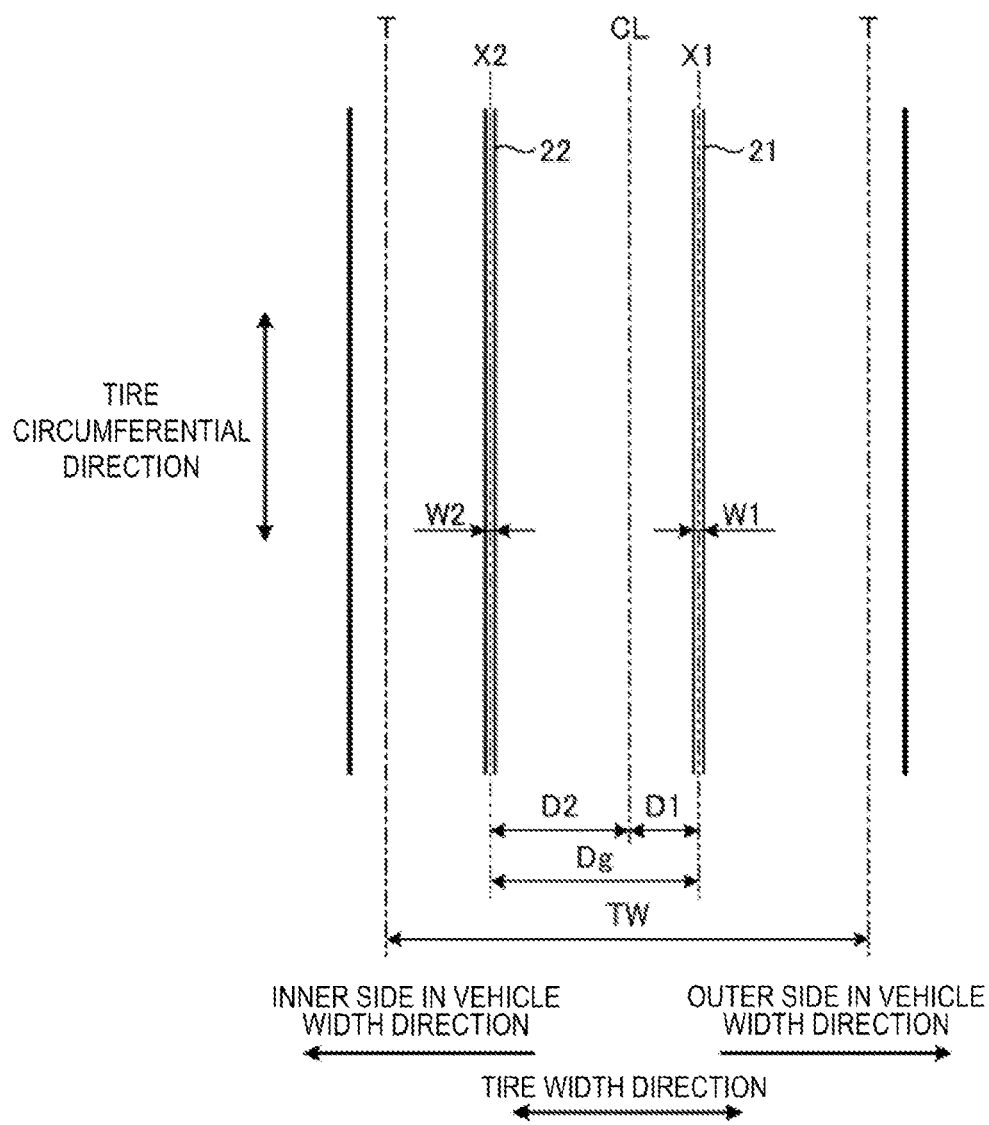
FIG. 6 is an explanatory diagram illustrating a modified example of the tire illustrated in FIG. 2.

FIG. 6 is an explanatory diagram illustrating a modified example of the tire illustrated in FIG. 2. In the same drawing, constituents identical to those in FIG. 2 have identical reference signs, and descriptions thereof will be omitted.

In the configuration illustrated in FIG. 2, each of the first and second circumferential grooves 21, 22 includes a plurality of groove portions 211, 221 arranged discontinuously in a row in the tire circumferential direction. Such a configuration preferably increases the ground contact area of the tire and can improve the tire traction performance while maintaining the tire wet performance.

In contrast, in the configuration in FIG. 6, each of the first and second circumferential grooves 21, 22 extends continuously in the tire circumferential direction. In such a configuration, compared with the configuration illustrated in FIG. 2, the configuration as described above preferably increases the groove area of the tire and can improve the tire wet performance while maintaining the tire traction performance.

Effect

As described above, the tire 1 includes the mounting direction indicator (not illustrated) that indicates the tire mounting direction with respect to a vehicle. Additionally, the tire 1 includes the first and second circumferential grooves 21, 22 extending intermittently or continuously in the tire circumferential direction (see FIG. 2). Additionally, with the tire mounted on the vehicle, the second circumferential groove 22 is located further on the inner side than the first circumferential groove 21 in the vehicle width direction. In addition, the distance D1 from the tire equatorial plane CL to the groove center line X1 of the first circumferential groove 21 and the distance D2 from the second circumferential groove 22 to the groove center line X2 have the relationship D1<D2.

In such a configuration, the distance D2 of the second circumferential groove 22 on the inner side in the vehicle width direction is greater than the distance D1 of the first circumferential groove 21 on the outer side in the vehicle width direction (D1<D2), and thus on the tread surface, the first and second circumferential grooves 21, 22 are disposed on the inner side in the vehicle width direction in a biased manner. Thus, the groove area ratio of the inner region of the tread surface in the vehicle width direction is increased, improving the wet performance of the tire, while the ground contact area ratio of the outer region in the vehicle width direction is increased, improving the traction performance of the tire on dry road surfaces. This has an advantage in that the tire wet performance and the traction performance on dry road surfaces are improved in a compatible manner.

Additionally, in the tire 1, the distance D1 of the first circumferential groove 21 and the distance D2 of the second circumferential groove 22 have the relationship $1.11 \leq D2/D1 \leq 2.00$ (see FIG. 2). Thus, there is an advantage in that the above-described biased location of the circumferential grooves 21 and 22 appropriately produces the effect of improving the wet performance and traction performance of the tire.

Additionally, in the tire 1, the maximum groove width W1 of the first circumferential groove 21 and the maximum groove width W2 of the second circumferential groove 22 have the relationships $0.020 \leq W1/TW \leq 0.080$ and $0.020 \leq W2/TW \leq 0.080$ with respect to the tire ground contact width TW (see FIG. 2). The lower limit described above has the advantage of ensuring drainage properties of the circumferential grooves 21, 22. Additionally, the upper limit has the advantage of suppressing degradation of the traction performance due to the excessive width of the circumferential grooves 21, 22.

Additionally, in the tire 1, the maximum groove depths H1, H2 of the first and second circumferential grooves 21, 22 are in the range of 2.5 mm or more and 5.0 mm or less. This has the advantage of appropriately setting the maximum groove depths H1, H2 of the circumferential grooves 21, 22.

Additionally, in the tire 1, the groove area A1 of the first circumferential groove 21 and the groove area A2 of the second circumferential groove 22 have the relationships $0.020 \leq A1/Sa \leq 0.100$ and $0.020 \leq A2/Sa \leq 0.100$, with respect to the area Sa of the tire ground contact region. This has the advantage of appropriately setting the groove areas A1, A2 of the circumferential grooves 21, 22.

Additionally, in the tire 1, no other grooves or recess portions having an opening area greater than 40 mm$^2$ are provided in the tire ground contact region (see FIG. 2). This has the advantage of ensuring the ground contact area of the tire and appropriately ensuring the effect of improving the traction performance of the tire described above.

Additionally, in the tire 1, the groove area ratio of the tire ground contact region is in the range of 3.0% or more and 5.0% or less. This has the advantage of ensuring the traction characteristics of the tire, especially a race tire.

Additionally, in the tire 1, the distance Dg in the tire width direction between the groove center line X1 of the first circumferential groove 21 and the groove center line X2 of the second circumferential groove 22 has the relationship $0.10 \leq Dg/TW \leq 0.90$ with respect to the tire ground contact width TW (see FIG. 2). The lower limit described above has the advantage of ensuring the distance Dg between adjacent ones of the circumferential grooves 21, 22, suppressing uneven wear of the ribs defined by the adjacent circumferential grooves 21, 22. The upper limit described above has the advantage of suppressing degraded wet performance caused by an excessively short distance from the circumferential grooves 21, 22 to the tire ground contact edge T.

Additionally, in the tire 1, the first circumferential groove 21 is disposed in the outer region in the vehicle width direction, and the second circumferential groove 22 is disposed in the inner region in the vehicle width direction, the outer region and the inner region being demarcated by the tire equatorial plane CL (see FIGS. 2, 5, and 6). Compared with the configuration in FIG. 4, the configuration as described above has the advantage of improving uneven wear resistance of the tire.

Additionally, in the tire 1, both the first and second circumferential grooves 21, 22 are disposed in the inner region in the vehicle width direction, the inner region being demarcated by the tire equatorial plane CL (see FIG. 4). Compared with the configuration in FIG. 2, the configuration as described above has an advantage in that the above-described biased location of the circumferential grooves 21, 22 efficiently produces the effect of improving the wet performance and traction performance of the tire.

Additionally, in the tire 1, each of the first and second circumferential grooves 21, 22 includes a plurality of groove portions 211, 221 arranged discontinuously in a row in the tire circumferential direction, thus extending intermittently in the tire circumferential direction (see FIGS. 2, 4, and 5). Compared with the configuration in FIG. 6, the configuration as described above has the advantage of improving the traction performance of the tire.

Additionally, in the tire 1, each of the first and second circumferential grooves 21, 22 extends continuously in the tire circumferential direction (see FIG. 6). Compared with the configuration in FIG. 2, the configuration as described above has the advantage of improving the wet performance of the tire.

Additionally, in the tire 1, the tire cross-sectional height SH has the relationship $0.20 \leq SH/SW \leq 0.70$ with respect to the total tire width SW, and the tire ground contact width TW has the relationship $0.90 \leq TW/SW \leq 0.98$ with respect to the total tire width SW (see FIG. 1). This has the advantage of appropriately setting the aspect ratio SH/SW of the tire and the tire ground contact width TW.

Additionally, the tire 1 includes the pair of bead cores 11, 11, the carcass layer 13 extended across the pair of bead cores 11, 11, the pair of cross belts 141, 142 disposed on the outer circumference of the carcass layer 13, and the tread rubber 15 disposed on the outer side of the cross belts 141, 142 in the radial direction (see FIG. 1). Additionally, the width Wb of the wider cross belt of the pair of cross belts 141, 142 (the cross belt 141 on the inner diameter side in FIG. 1) has the relationship $0.98 \leq Wb/TW \leq 1.10$ with respect to the tire ground contact width TW. As a result, there is an advantage that the durability of the tire is appropriately secured.

Additionally, the tire 1 includes the pair of bead cores 11, 11, the carcass layer 13 extended across the pair of bead cores 11, 11, the pair of cross belts 141, 142 disposed on the outer circumference of the carcass layer 13, and the tread rubber 15 disposed on the outer side of the cross belts 141, 142 in the radial direction (see FIG. 1). Additionally, the gauge Gr of the tread rubber 15 is in the range of 30% or more and 60% or less with respect to the total gauge Gt of the tread portion on the groove center lines of the first and second circumferential grooves 21, 22 (see FIG. 3). This has the advantage of appropriately setting the gauge Gr of the tread rubber 15.

Examples

Figure 9:
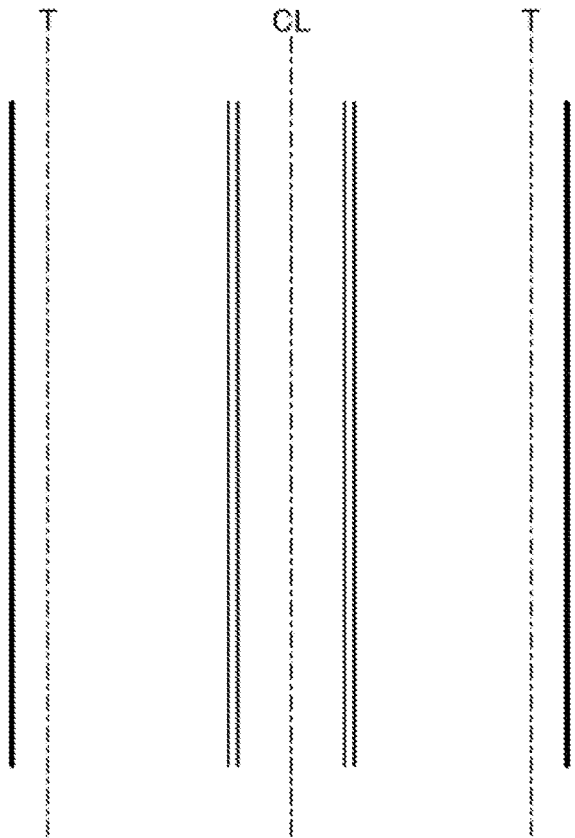
FIG. 9 is an explanatory diagram illustrating a test tire of Conventional Example illustrated in FIG. 7.

FIGS. 7 and 8 are tables indicating the results of performance tests of tires according to embodiments of the technology. FIG. 9 is an explanatory diagram illustrating a test tire of Conventional Example illustrated in FIG. 7.

In the performance tests, the (1) dry performance and (2) wet performance were evaluated for a plurality of types of test tires. Additionally, a test tire having a tire size of P205/50R15 84W was assembled on a rim specified by JATMA, and mounted on all wheels of a four-wheeled passenger car having a weight of 990 [kg]. In addition, the test tires were inflated to an internal pressure of 160 kPa in the cold and to an internal pressure of 220 kPa in the warm.

In the evaluation related to dry performance, the test vehicle ran four laps of a predetermined circuit of 3.7 km in an environment with clear weather, a road surface temperature of 18° C., and a temperature of 28° C., and the lap times were measured. The best lap time was used to express the results as index values for evaluation, with Conventional Example being assigned as the reference (100). In this evaluation, larger values are preferable.

In the evaluation related to the wet performance, the test vehicle ran four laps of the circuit of 3.7 km, sprinkled with water to a water depth of 1 mm, and the lap time was measured. The best lap time was used to express the results as index values for evaluation, with Conventional Example being assigned as the reference (100). In this evaluation, larger values are preferable. Moreover, an evaluation value of 99 or more indicates that the performance is appropriately maintained.

The test tires of the Examples have the configurations in FIGS. 1 to 3, and the first circumferential groove 21 is disposed in the outer region in the vehicle width direction, and the second circumferential groove 22 is disposed in the inner region in the vehicle width direction, the outer region and the inner region being demarcated by the tire equatorial plane CL. Additionally, each of the first and second circumferential grooves 21, 22 includes a plurality of groove portions 211, 221 arranged discontinuously in a row in the tire circumferential direction. Additionally, the tire outer diameter is 586 mm, the tire cross-sectional height SH is 103 mm, the total tire width SW is 216 mm, the tire ground contact width TW is 202 mm, and the belt width Wb of the wider cross belt 142 is 203 mm. Additionally, the gauge Gr of the tread rubber 15 on the groove center lines X1 and X2 of the circumferential grooves 21, 22 is in the range of 4.0 mm to 4.7 mm, and the total gauge Gt of the tread portion is in the range of 10 mm to 11 mm. Additionally, the groove depths H1 and H2 of the first and second circumferential grooves 21, 22 are such that H1=H2=3.3 mm.

The test tire of Conventional Example has the configuration illustrated in FIG. 9, and differs from the test tire of Example 1 in that the first and second circumferential grooves extend continuously in the tire circumferential direction and in that the first and second circumferential grooves are disposed in a left-right symmetric manner with respect to the tire equatorial plane CL.

As can be seen from the test results, the test tires of Examples provide dry performance and wet performance of a tire in a compatible manner.

The invention claimed is:

1. A tire comprising a mounting direction indicator indicating a tire mounting direction with respect to a vehicle, the tire being a racing pneumatic radial tire configured both for public road running and for circuit running, the tire comprising:
   a first circumferential groove and a second circumferential groove extending intermittently in a tire circumferential direction,
   the second circumferential groove being located further on an inner side than the first circumferential groove in a vehicle width direction in a state in which the tire is mounted on the vehicle,
   a distance D1 from a tire equatorial plane to a groove center line of the first circumferential groove and a distance D2 from the tire equatorial plane to a groove center line of the second circumferential groove having a relationship D1<D2,
   each of the first and second circumferential grooves including a plurality of grooves arranged discontinuously in a row in the tire circumferential direction and extending intermittently in the tire circumferential direction, and
   each of opening areas of the groove portions constituting the first and second circumferential grooves being in a range of 200 mm$^2$ or more and 340 mm$^2$ or less, wherein maximum groove depths of the first and second circumferential grooves are in a range of 2.5 mm or more and 5.0 mm or less, and
   a groove area ratio of a tire ground contact region is in a range of 3.0% or ore and 5.0% or less,
   wherein a tire cross-sectional height SH has a relationship 0.20≤SH/SW≤0.70 with respect to a total tire width SW, and a tire ground contact width TW has a relationship 0.90≤TW/SW≤0.98 with respect to the total tire width SW.

2. The tire according to claim 1, wherein the distance D1 of the first circumferential groove and the distance D2 of the second circumferential groove have a relationship 1.11≤D2/D1≤2.00.

3. The tire according to claim 1, wherein a maximum groove width W1 of the first circumferential groove and a maximum groove width W2 of the second circumferential groove have relationships 0.020≤W1/TW≤0.080 and 0.020≤W2/TW≤0.080 with respect to a tire ground contact width TW.

4. The tire according to claim 1, wherein a groove area A1 of the first circumferential groove and a groove area A2 of the second circumferential groove have relationships 0.015≤A1/Sa≤0.100 and 0.015≤A2/Sa≤0.100 with respect to an area Sa of a tire ground contact region.

5. The tire according to claim 1, wherein no other grooves or recess portions having an opening area of greater than 40 mm$^2$ are provided in a tire ground contact region.

6. The tire according to claim 1, wherein a distance Dg in a tire width direction between a groove center line of the first circumferential groove and a groove center line of the second circumferential groove has a relationship 0.10≤Dg/TW≤0.90 with respect to a tire ground contact width TW.

7. The tire according to claim 1, wherein the first circumferential groove is disposed in an outer region in the vehicle width direction, and the second circumferential groove is disposed in an inner region in the vehicle width direction, the outer region and the inner region being demarcated by the tire equatorial plane.

8. The tire according to claim 1, wherein both the first and second circumferential grooves are disposed in an inner region in the vehicle width direction, the inner region being demarcated by the tire equatorial plane.

9. The tire according to claim 1, comprising a pair of bead cores, a carcass layer extended across the pair of bead cores, a pair of cross belts disposed on an outer circumference of the carcass layer, and tread rubber disposed on an outer side of the pair of cross belts in a radial direction, wherein a width Wb of a wider cross belt of the pair of cross belts has a relationship 0.98≤Wb/TW≤1.10 with respect to a tire ground contact width TW.

10. The tire according to claim 1, comprising a pair of bead cores, a carcass layer extended across the pair of bead cores, a pair of cross belts disposed on an outer circumference of the carcass layer, and tread rubber disposed on an outer side of the pair of cross belts in a radial direction, wherein a gauge of the tread rubber is in a range of 30% or more and 60% or less of a total gauge of a tread portion on groove center lines of the first and second circumferential grooves.

* * * * *